United States Patent [19]

Kelley et al.

[11] 4,030,618
[45] June 21, 1977

[54] SEMI-AUTOMATIC PALLETIZER

[75] Inventors: Norman S. Kelley; Florentin J. Pearne, both of Whittier, Calif.

[73] Assignee: Aircraft Mechanics, Inc., Colorado Springs, Colo.

[22] Filed: May 1, 1975

[21] Appl. No.: 573,524

[52] U.S. Cl. .............................. 214/6 P; 193/35 A; 214/6 H; 214/8.5 F
[51] Int. Cl.$^2$ ...................................... B65G 57/24
[58] Field of Search .................. 214/6 P, 6 H, 8.5 F, 214/8.5 G; 193/35 A

[56] References Cited
UNITED STATES PATENTS

| | | | |
|---|---|---|---|
| 2,360,708 | 10/1944 | Muddiman | 193/35 A |
| 2,701,650 | 2/1955 | Stevenson | 214/6 P X |
| 2,947,405 | 8/1960 | Fenton | 214/6 P X |
| 2,979,177 | 4/1961 | Sullivan | 193/35 A |
| 3,069,050 | 12/1962 | Brettrager | 214/8.5 G X |
| 3,442,400 | 5/1969 | Roth et al. | 214/6 P |
| 3,468,436 | 9/1969 | Nanney et al. | 214/6 P |
| 3,682,338 | 8/1972 | Von Gal et al. | 214/6 P X |
| 3,700,127 | 10/1972 | Kurk et al. | 214/6 P X |

Primary Examiner—L. J. Paperner

Attorney, Agent, or Firm—NcNenny, Pearne, Gordon, Gail, Dickinson & Schiller

[57] ABSTRACT

A semi-automatic palletizer is disclosed providing an elevator for positioning pallets below an arranging table to receive layers of arranged articles. As each layer is positioned on a pallet supported by the elevator, the elevator lowers to position the uppermost layer thereon, immediately below the arranging table. A power feed mechanism is provided to automatically position empty pallets on the elevator and for ejecting loaded pallets from the elevator. The feed mechanism includes a fork-type lift which is extended into the pallet, adjacent to the bottommost pallet at the pallet supply position, and which thereafter raises such pallet and all pallets above, clear of the bottom pallet at the supply position. A pusher pushes an empty pallet from the supply position onto the elevator and causes removal of a loaded pallet as the empty pallet is supplied. After retraction of the pusher, the fork lift mechanism lowers the remaining pallets to the supply platform. Rollers on the elevator are provided with a friction drag having a value sufficiently high so that empty pallets remain in proper position on the elevator during loading, but sufficiently low so that a loaded pallet can be easily rolled off of the elevator.

8 Claims, 7 Drawing Figures

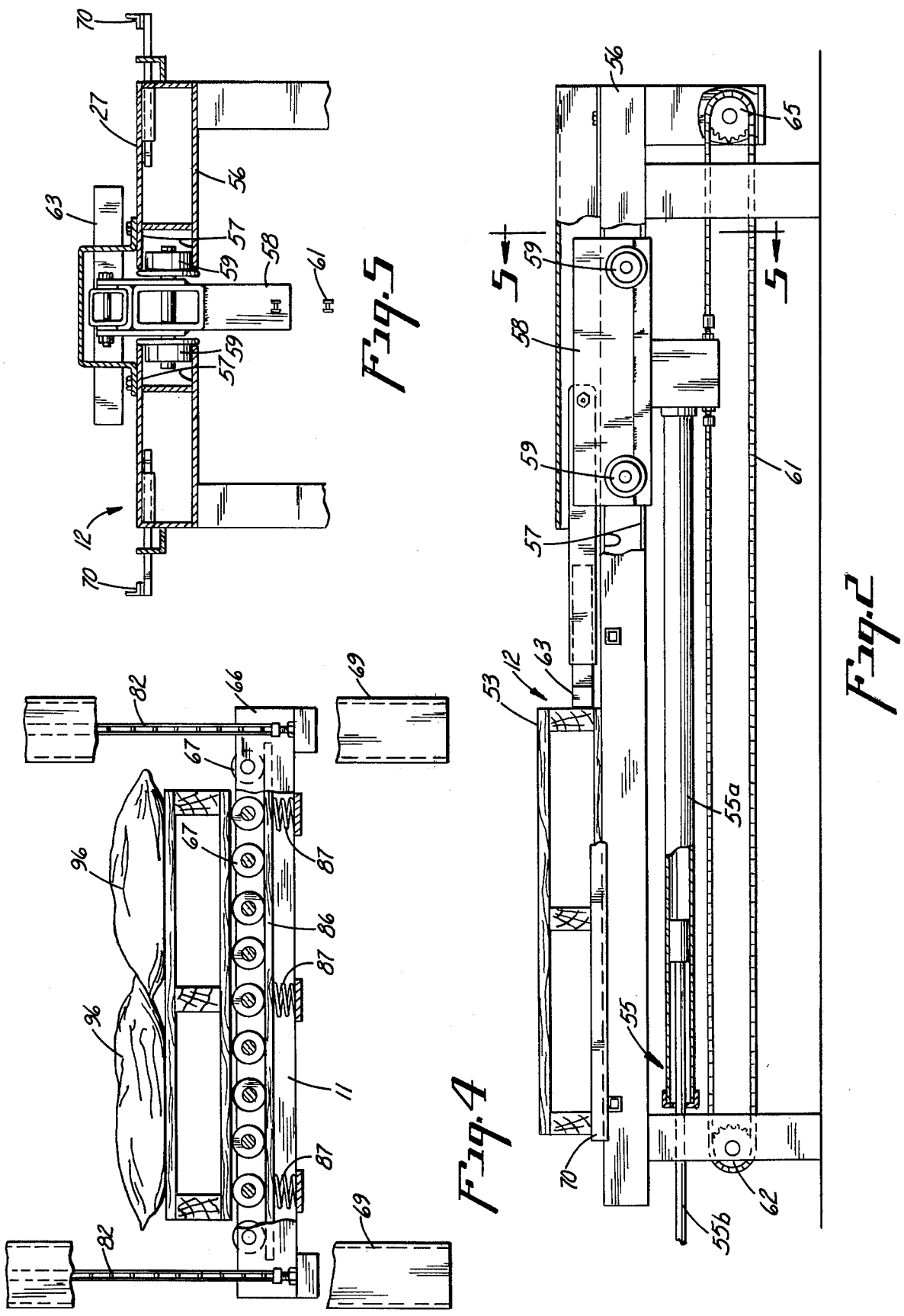

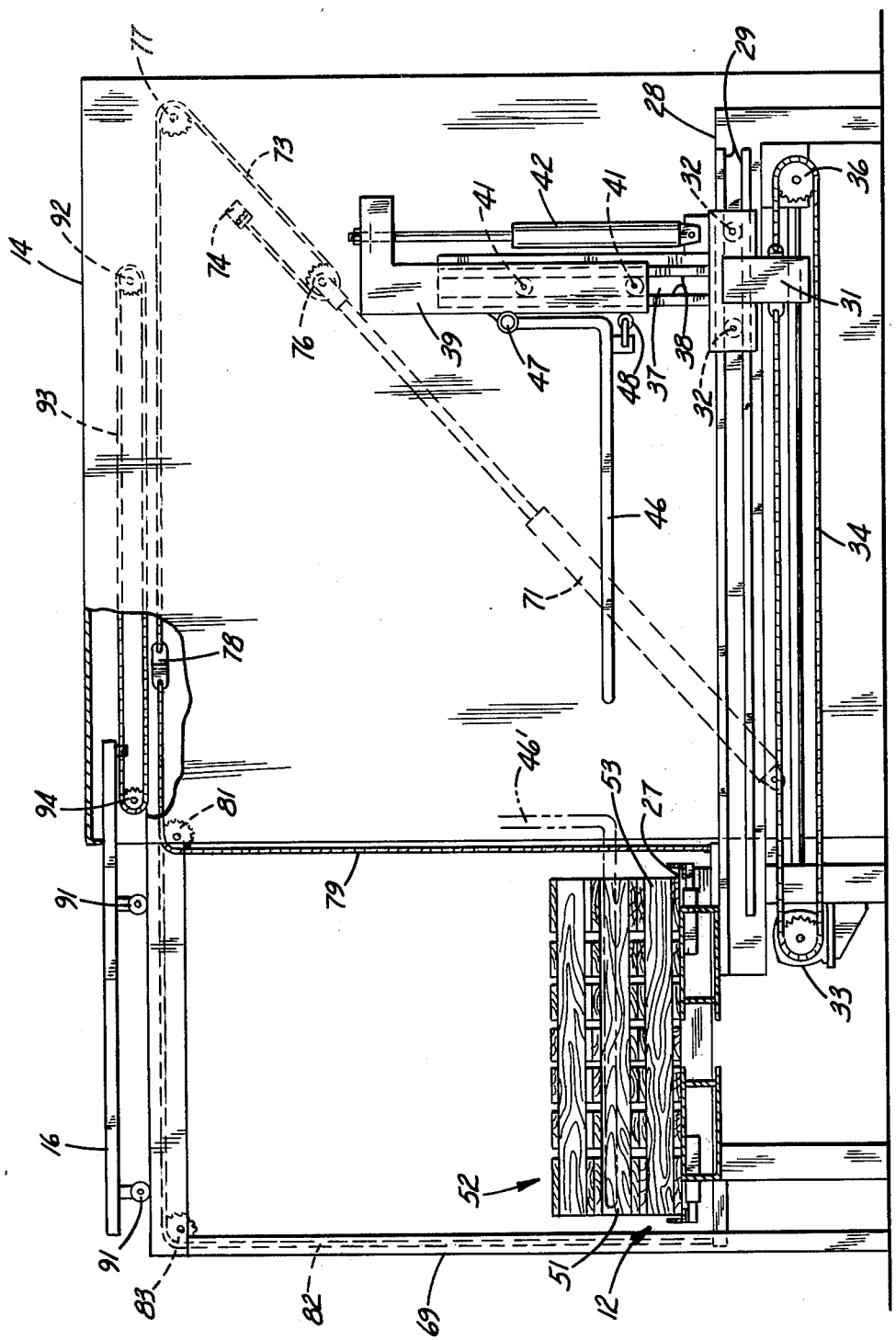

SEMI-AUTOMATIC PALLETIZER

BACKGROUND OF THE INVENTION

This invention relates generally to palletizers and more particularly to a novel and improved palletizer having an improved pallet feed and positioning mechanism.

PRIOR ART

In the U.S. Pat. No. 3,624,782 dated Nov. 30, 1971, assigned to the assignee of the present invention, a semi-automatic palletizer is disclosed, which permits an operator to progressively arrange layers of articles on an arranging table and to sequentially position such layers on a pallet. With this device, the physical effort of palletizing the articles is greatly reduced.

Various palletizing systems have also been provided to automatically feed pallets to a loading station from a stack of pallets. Examples of such systems are disclosed in the U.S. Pat. No. 3,101,852 dated Aug. 27, 1963 and U.S. Pat. No. 3,159,896 dated Dec. 8, 1964, both assigned to the assignee of the present invention. In such patents, the pallet feed mechanism is arranged to permit the feeding of a bottom pallet from a stack of empty pallets.

SUMMARY OF THE INVENTION

The present invention is an improvement of the prior palletizing apparatus disclosed in the U.S. Pat. No. 3,624,782, and the disclosure of such patent is incorporated herein by reference.

There are several important aspects to the present invention. In accordance with one important aspect of this invention, a palletizer is provided with novel and improved means to automatically supply and position pallets for loading. In accordance with another important aspect of this invention, an improved pallet feed mechanism is provided in which single pallets are positioned for loading from a stack of pallets.

In the illustrated embodiment, a stack of empty pallets is positioned in the machine. Usually a fork lift truck is used for this purpose. The machine is provided with a powered fork mechanism which extends into the next to the bottom pallet in the stack and lifts such pallet and all pallets resting thereon off of the bottom pallet. While all pallets but the bottom pallet are supported by the fork, a pusher pushes the empty bottom pallet into a loading position and pushes a loaded pallet out of the loading position. After the pusher retracts to its rest position, the fork lowers the remaining pallets and withdraws to its rest position.

At the pallet loading position is a pallet elevator. An empty pallet is positioned on the elevator which then raises the empty pallet to a position immediately below the arranging table. As the layers are sequentially transferred from the arranging table to the pallet, the elevator lowers to position the top layer resting on the pallet, immediately below the arranging table. When the pallet on the elevator is fully loaded, the elevator returns to its initial lower position.

A pusher mechanism engages an empty pallet and the loaded pallet and moves the loaded pallet off the elevator onto a gravity conveyor at the same time it moves the empty pallet into the loading position. In order to permit easy movement of the loaded pallet off the elevator, the elevator is provided with support rollers for the pallet. Friction drag means provide a predetermined drag on such rollers so that a pallet resting on the elevator remains in the proper position for loading. In the illustrated embodiment, the friction drag is provided by a plank, which is resiliently pressed against the lower side of the rollers. The drag force is preferably selected so that an empty pallet will not cause roller rotation, as it is pushed into the loading position, but the drag force is sufficiently small so that a loaded pallet can be easily pushed out of the loading position without damage to the loaded pallet. The frictional force is sufficiently strong to prevent roller rotation while the pallet is being loaded. Since the elevator supports the pallets in a level position, there are no substantial gravity forces to tend to cause pallet movement with respect to the elevator. Therefore, relatively low frictional drag forces may be used.

BRIEF DESCRIPTION OF THE DRAWINGS

FIG. 2 is an enlarged fragmentary view taken generally along 2—2 of FIG. 1, with parts broken away for purposes of illustration, FIG. 3 is an enlarged fragmentary side elevation taken generally along 3—3 of FIG. 1, with parts broken away for purposes of illustration, FIG. 4 is an enlarged fragmentary section, taken generally along 4—4 of FIG. 1 with parts broken away for purposes of illustration, FIG. 5 is an enlarged fragmentary section taken generally along 5—5 of FIG. 2, with parts broken away for purposes of illustration, and FIGS. 6 and 7 schmetacially illustrate the operation of the pusher mechanism.

DETAILED DESCRIPTION OF THE DRAWINGS

Figure 1:
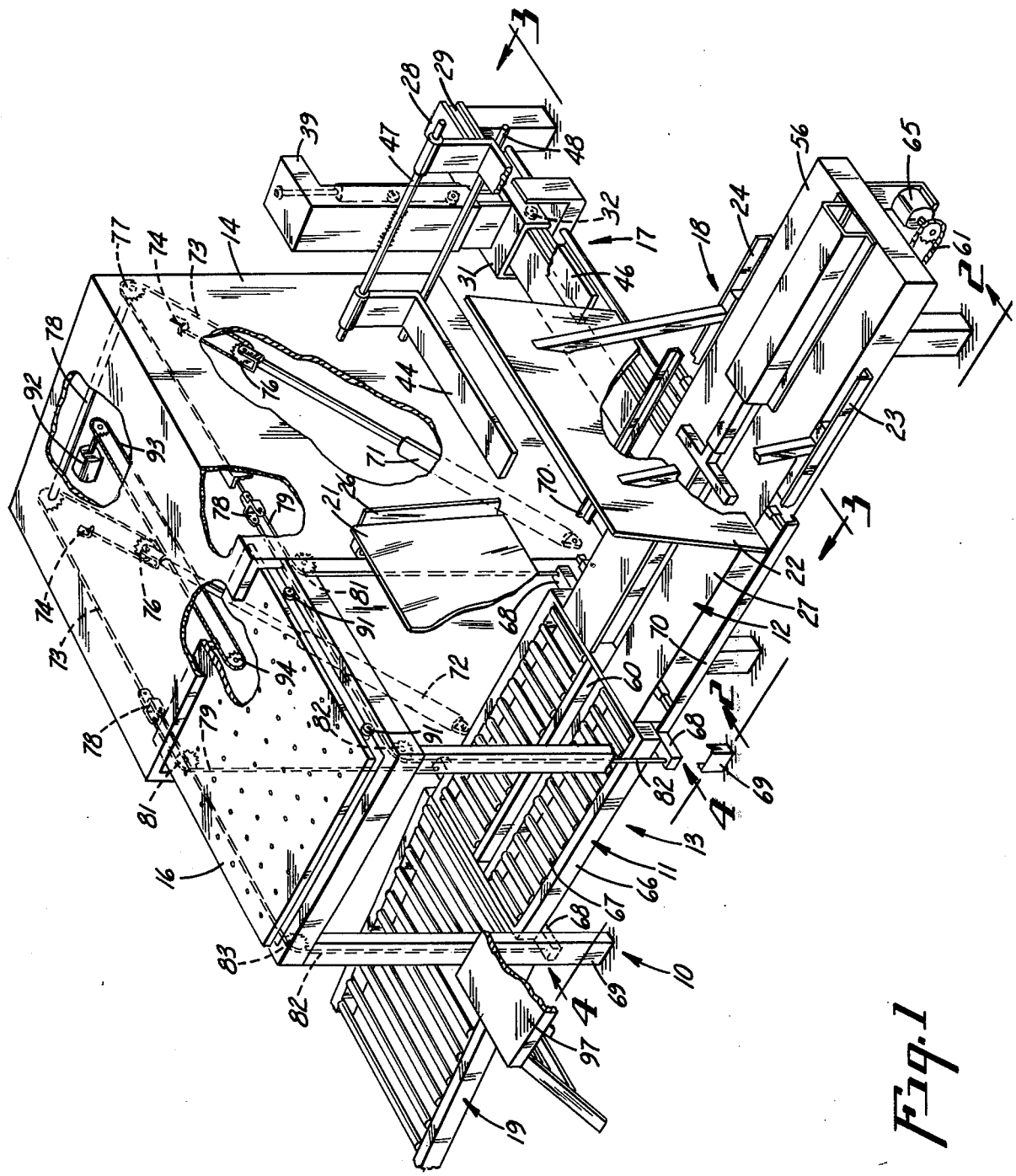
FIG. 1 is a perspective view with parts broken away for purposes of illustration, illustrating the overall palletizer in accordance with a preferred embodiment of this invention.

The illustrated preferred embodiment of this invention is shown generally in FIG. 1. In this embodiment, the palletizer is provided with a main frame 10 for the support of a loading elevator 11 which supports a pallet during the loading of the pallet. A pallet supply position is provided at 12, immediately adjacent to the loading position 13, occupied by the elevator 11. Behind the loading position 13 is an enclosure 14 which houses the power mechanism for raising and lowering the elevator 11, the drive for the arranging table, and the blower (not illustrated) which supplies air to the arranging table 16. A powered fork assembly 17 is located immediately behind the pallet supply position 12 and a pallet pusher assembly 18 is located on the side of the pallet supply position 12, remote from the loading position 13. A gravity-type exit conveyor 19 extends from the loading position 13 to convey loaded pallets from the machine.

A supply of pallets in the form of a stack is positioned at the pallet supply position 12 between inclined guide boards 21 and 22. The guide boards 21 and 22 are adjusted so that they are spaced from each other at their bottoms by a distance equal roughly to the width of a pallet. They diverge in an upward direction from each other to permit the acceptance of a stack of pallets in which the pallets in the stack are not in exact alignment, but as the pallets move downward along the guide boards, the bottommost pallets are positioned properly at the pallet supply position. The guide board 21 is normally in a fixed position with respect to the frame 10 and is supported thereby by a structure which has been omitted from the drawings for purposes of illustration. However, the guide board 22 is supported by the frame and channels 23 and 24, so that the guide board 22 can be adjusted toward or away from the guide board 21 to properly accommodate the particular size pallets being loaded.

An end guide plate 26 is mounted on each end of the guide boards 21 and 22, and is preferably supported for adjustment in an inclined manner so that pallets in the stack are guided as they move downward to the proper position at the pallet supply position. In the drawings, only one of the guide plates 26 is illustrated, but it should be understood that there are guide plates mounted on each end of each of the guide boards 21 and 22. When supplied with a stack of pallets, the bottommost pallet normally rests on the platform 27 at the pallet supply position. The side of the pallet supply position 12, remote from the pallet fork assembly 17, is open to provide access for the supplying of the machine with stacks of pallets. Such supply will usually be positioned in the machine by the use of a fork lift truck.

The pallet fork assembly 17 and the pallet pusher assembly 18 cooperate to supply single empty pallets to the pallet loading postion 13, from the pallet supply position 12. The powered fork assembly 17 includes a support track member 28, having guide tracks 29 on opposite sides thereof. A first carriage 31 is provided with rollers 32, which roll along the tracks 29 on the opposite sides of the member 28 and support the carriage 31 for a horizontal movement back and forth along the member 28.

A chain drive is connected to the carriage 31 to power the carriage back and forth along the member 28. This drive includes a hydraulic motor 33, which drives a chain 34, the upper reach of which is connected to the carriage 31, as best illustrated in FIG. 3. The chain extends over an idler pulley 36 so that clockwise rotation of the motor 33, as viewed in FIG. 3, causes the chain to pull the carriage 31 back to the position illustrated which is the rest position. Anticlockwise rotation of the motor causes the chain to pull the carriage 31 forward to a position substantially adjacent to the pallet supply position 12.

The carriage 31 is provided with an upstanding mast 37 having opposed tracks 38 along opposite sides. A secondary or fork support carriage 39 is provided with rollers 41, which move along the tracks 38 and support the carriage 39 on the main carriage 31, for a vertical movement with respect thereto. A piston and cylinder actuator 42 is connected between the two carriages 31 and 39, to raise and lower the carriage 39.

A pair of fork members 44 and 46 are pivotally supported on a support bar 47, (best illustrated in FIG. 1) which is, in turn, welded to and carried by the carriage 39. A base bar 48 connects between the fork members 44 and 46, and engages the carriage 39 when the fork members 44 and 46 extend in a horizontal direction. This structure permits the fork members 44 and 46 to be pivoted up from their horizontal position, but maintains such members against pivotal movement down below the illustrated horizontal position.

The hydraulic motor 33 and the actuator 42 are controlled by a control system so that the fork members 44 and 46 are positioned to extend into the second from the bottom pallet 51, in the stack of pallets 52, resting on the platform 27 at the supply position 12. The motor 33 is then actuated in an anti-clockwise direction to move the fork assembly from its rest position illustrated in FIG. 3 forward to its operated position illustrated in phantom in FIG. 3 at 46'. The actuator 42 is then operated to raise the forks 44 and 46 to lift the pallet 51 and all pallets resting thereon, up off of the bottom pallet 53 so that the pusher assembly 18 can operate to push the bottom pallet into the loading position 13. After the bottom pallet in the stack is pushed into the loading position, the pusher retracts to its rest position and the actuator 42 is operated to lower the stack of pallets supported thereby until the pallet 51 rests upon the platform 27. The motor 33 then operates to move the carriage 31 back to its rest position therby moving the fork clear of the stack.

The pusher assembly 18 is illustrated in FIGS. 1, 2 and 5. This assembly includes a support frame 56, which provides opposed track portions 57 (illustrated in FIG. 5). A pusher carriage 58 is provided with rollers 59, which roll along the tracks 57 to support the carriage 58 for horizontal movement with respect to the frame 56. A hydraulic motor 59 powers a chain 61, which extends over an idler pulley 62 and is connected in its upper reach to the carriage 58 so that anti-clockwise rotation of the motor 59, as viewed in FIG. 2, causes the pusher carriage 58 to be moved to the left from the illustrated position. Clockwise rotation of the motor 59, of course, causes rightward movement to the rest position of the carriage.

Supported by the carriage 58 is a pusher bar 63, which is engageable with a side of the bottom pallet 53 at the pallet supply position so that extension of the pusher pushes the pallet 53 from the pallet supply position onto the elevator 11 at the loading position. The operation of the pusher, of course, occurs while the pallets at the supply position other than the bottom pallet are supported by the fork members 44 and 46, clear of the bottom pallet. The guide board 21 is positioned so that its lower edge is spaced above the platform 12, a sufficient distance to allow the pallet 53 to be pushed from the pallet supply position to the loading position. Adjustable guide raisl 70 laterally guide the empty pallet as it is moved onto the elevator.

Figure 6:
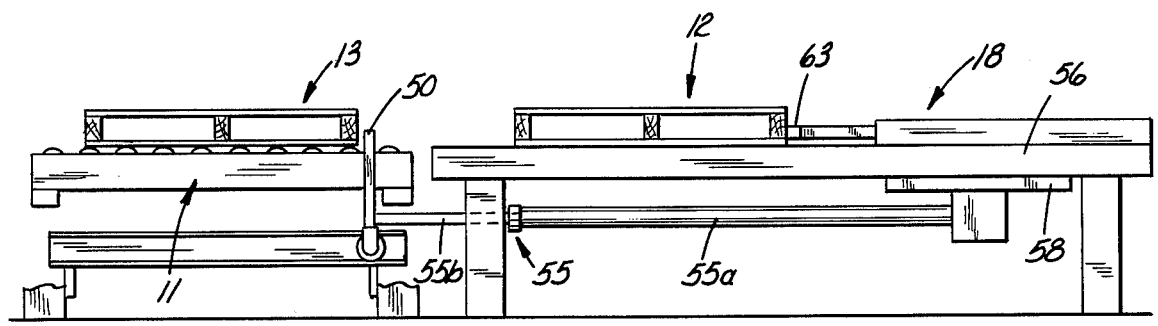
Figure 7:
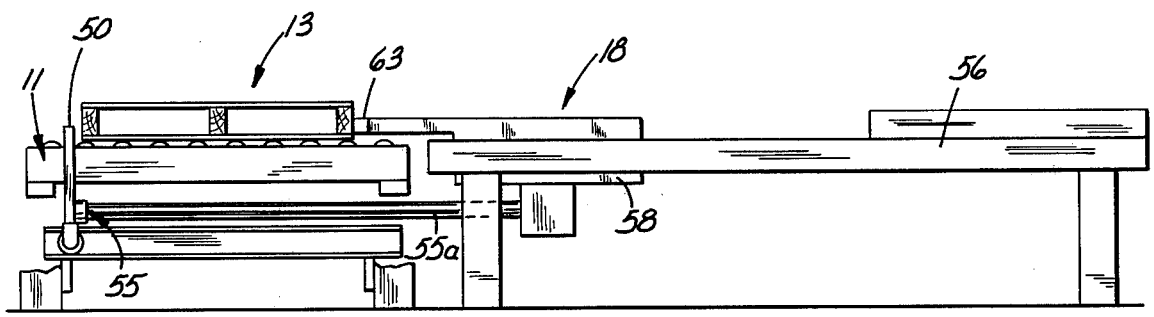

The pusher mechanism also includes an upstanding pusher dog 50 (illustrated in FIGS. 6 and 7) which is driven by a lost motion drive 55 and operates to push a loaded pallet from the elevator at the same time an empty pallet is moved onto the elevator.

The elevator 11 includes a generally rectangular frame 66, which supports a plurality of laterally extending rollers 67, as best illustrated in FIG. 1. The frame 66 is provided with corner extensions 68, which fit into and are guided by vertical frame channels 69. The rollers 67 are provided in two groups which are laterally spaced (see FIG. 1) to provide a central opening 60 along which the pusher dog 50 moves.

The power mechanism for raising and lowering the elevator includes a pair of piston and cylinder actuators 71 and 72, located in the housing 14. Similar chains 73 are anchored at 74 and extend around sprocket pulleys 76, carried by the piston of the associated actuator. From the pulley 76, the chains extend around sprocket pulleys 77, which are mounted on a shaft 78 within the frame 14, to a clevis 78. Because the sprocket pulleys 77 are fixed to the shaft 78, the operation of the two actuators is mechanically synchronized so that they operate in unison. A first chain 79 extends from each clevis 78 around an idler sprocket 81, and down to a rearward frame projection 68 on the elevator frame 66.

A second chain 82 extends from each clevis 78 over an idler sprocket 83 and down to a forward corner projection 68. With this structure, retraction of the pistons of the actuators 71 and 72 operate to to raise the elevator frame 66 and extension operates to lower the frame. Because the two chains 73 are mechanically connected together by virtue of the shaft 78, these chains move in unison and the elevator remains level. Because the two chains 73 are anchored at one end and extend around pulleys 76, carried by pistons of the actuators, a motion multiplication system is provided in which retraction or extension of the pistons through a given distance causes vertical movement of the elevators through twice such distance. In the lowered position illustrated in FIG. 1, the upper surface of the rollers 67 is in horizontal alignment with a platform 27. However, the actuators are operable to raise the elevator to a position in which a pallet resting on the elevator is located immediately below the arranging table 16.

Referring to FIG. 4, a friction brake mechanism is provided to resist rotation of the rollers 67. In the illustrated embodiment, a very simple structure is utilized in which a plank 86 is resiliently biased into engagement with the lower side of the roller 67, by springs 87. This structure provides a frictional drag, resisting rotation of the rollers having a predetermined value which is not affected by the load carried by the rollers. It is recognized that the drag applied to one roller may be greater than the drag applied to another roller because of tolerances or the like. However, since the rollers function substantially in unison, the net drag is the significant value and it does not matter, within reasonable limits, if one roller has more drag than the adjacent.

The exit conveyor 19 is also provided with lateral rollers and is inclined so that gravity causes a loaded pallet to roll along the exit conveyor to the delivery position of the machine.

The arranging table 16 is supported on rollers 91 for movement along the frame support from the extended position illustrated in FIG. 1, to a retracted position in which it is clear of the loading position and contained within the housing 14. The retraction and extension of the arranging table 16 is provided by a hydraulic motor 92, which drives a chain 93, extending over an idler pulley 94. The upper reach of the chain 93 is connected to the arranging table so that clockwise rotation of the motor 93 causes retraction of the arranging table and anti-clockwise rotation causes extension of the table.

The arranging table 16 is hollow to provide a plenum connected to a source of air pressure such as a fan and the upper surface of the arranging table is provided with a large number of small openings through which the air flows to cause a floating action of the articles resting on the table. This substantially eliminates any friction between articles on the table and the table itself, and permits easy movement of the articles by an operator into the desired arrangement. The fan and the hollow structure of the arranging table is not illustrated in the drawings. However, reference may be made to the U.S. Pat. No. 3,624,782, referred to above, for a detailed description of the structural arrangement.

The operation of the palletizer is substantially as follows. Articles such as bags 96, are supplied by a conveyor (not illustrated) to the arranging table. An operator stands on a work platform 97 and arranges the articles on the arranging table in the desired pattern. While this is done, the elevator positions a pallet so that the upper surface thereof or the upper surface of the top layer on the pallet is immediately below the arranging table. When a full layer is properly arranged on the table, the operator actuates a control which operates the motor 92 to retract the table, causing the layer to be transferred to the pallet. As soon as this occurs, the elevator automatically lowers so that the top of the layer just deposited on the pallet is located at a level just below the arranging table. The arranging table 16 is then extended, and another layer arranged for loading on the pallet. This process is repeated until the pallet is fully loaded.

When the pallet is fully loaded, the elevator is lowered to position the pallet in alignment with the platform 12 and the exit conveyor 19. During the lowering operation, the fork members 44 and 46 are extended into the pallet immediately above the bottom pallet in the stack of pallets by the operation of the hydraulic motor 33. The forks are then lifted by the operation of the actuator 42 so that the stack of pallets is lifted off of the bottom pallet in the stack. While the forks support the stack of pallets, the pusher is operated by actuation of the motor 59 to push the bottom pallet along the platform to the loading position 13 on the elevator 11.

During the initial movement of the pusher 18 the tube 55a of the lost motion drive 55 telescopes over the rod 55b until the forward end of the tube 55a engages the pusher dog 50. This occurs when the empty pallet is adjacent to but not contacting the pusher dog 50. Thereafter, continued movement of the pusher operates through the pusher dog 50 to push the loaded pallet along the elevator ahead of the empty pallet until gravity causes the loaded pallet to roll down the exit conveyor 19. At the end of the stroke the pusher elements reach the position of FIG. 7, at which time the pusher bar 63 extends over the elevator and the pusher dog 50 is immediately inside the far end of the elevator 11.

The pusher 18 is then retracted a distance sufficient to move the pusher bar 63 clear of the elevator, but insufficient to take up the lost motion of the drive 55 so that the pusher dog 50 remains in its extended position but the elevator is cleared to raise the empty pallet to the loading position. Once the elevator has raised the empty pallet clear of the pusher dog 50, the pusher continues to retract to its full retracted position of FIG. 6.

The actuator 42 is then retracted to lower the stack of pallets so that the pallet engaged by the forks 44 and 46 is positioned on the platform 27. The motor 33 then moves the fork members back to the rest position, clear of the pallets.

The frictional drag provided on the roller 67 is preferably arranged so that an empty pallet does not cause rotation of the rollers. Therefore, the pallet stops in a position determined by the pusher assembly 18 and remains in such position during the loading of the pallet. However, the frictional drag is sufficiently low so that the rollers turn when a loaded pallet is pushed off the elevator by the pusher dog 50 and is sufficiently low to prevent damage to the loaded pallet. Because the pallet supported by the elevator is maintained in a level condition, there is no substantial gravity force tending to cause rolling movement, so proper position of the pallet at the loading position is maintained by the simple expediency of the frictional drag brake. The elevator raises the empty pallet to a position immediately below the arranging table and the cycle is repeated to load such pallets.

The particular controls for the mechanism are not illustrated, but reference can be made to the U.S. Pat. No. 3,624,782 supra, for a disclosure of a control for positioning the elevator 11. Preferably the controls are arranged so that the operation of the various motors and actuators are substantially automatically controlled, and operate through the various cycles of operation when the operator actuates a control initiating a particular machine function. For example, the removal of a loaded pallet and the positioning of an unloaded pallet is initiated by a single action of the operator of the machine. Similarly, the retraction of the arranging table to deposit an arranged layer on a pallet initiates automatic controls which cause the elevator to lower the proper amount and the arranging table to thereafter extend to receive a subsequent layer. With the illustrated embodiment of this invention, the physical effort required to load a pallet is minimal, and very little operator skill is required. Further, the output of the machine is high, since all of the functions of the machine other than the arranging of the articles 96 on the arranging table are accomplished by power mechanisms.

Although a preferred embodiment of this invention is illustrated, it should be understood that various modifications and rearrangements of parts may be resorted to without departing from the scope of the invention disclosed and claimed herein.

What is claimed is:

1. A palletizer for use with pallets which can be handled by fork type handling equipment comprising a frame, an elevator supported on said frame for powered vertical movement between a lowered position and a raised position, an arranging table supported on said frame for powered movement between an extended position over said elevator and a retracted position clear of said elevator, a platform on said frame adjacent to and horizontally aligned with said elevator when said elevator is in said lowered position, said platform being adapted to support a stack of empty pallets, a pusher supported on said frame for powered movement between a rest position and an operated position, said pusher operating to push the bottom pallet in a stack of pallets from said platform onto said elevator when said elevator is in said lowered position, and a fork lift mechanism supported on said frame for powered horizontal movement between a rest position with its fork clear of said platform and an extended position with its fork over said platform, said fork lift mechanism being operable to insert its fork into the first pallet in the stack of pallets immediately above the bottom pallet in such stack, to raise said first pallet and all pallets thereabove clear of such bottom pallet, and thereafter to lower such first pallet to said platform after said pusher moves such bottom pallet to said elevator, said elevator being provided with roller support means for supporting pallets thereon, and brake means providing a substantially constant resistance to rotation of said rollers, said substantially constant resistance being sufficiently great to insure that a pallet positioned on said elevator is maintained in proper position excepting when moved by said pusher and being sufficiently small to allow movement of a loaded pallet with respect to said elevator by said pusher without damage to said loaded pallet.

2. A palletizer as set forth in claim 1 wherein said elevator is generally rectangular, and power means are connected to raise and lower said elevator, said power means include first and second piston and cylinder actuators, a chain drive operated by each actuator with each chain drive connected to two corners of the four corners of said elevator, and interconnected sprockets mechanically connecting said chain drives for synchronized operation.

3. A palletizer as set forth in claim 1 wherein pallet guide means are provided adjacent to said platform which are proportioned to receive a stack of misaligned pallets and operate to properly position the lower pallets in such stack.

4. A palletizer comprising a frame, an elevator supported on said frame for powered vertical movement between a lowered position and a raised position, an arranging table supported on said frame for powered movement between an extended position over said elevator and a retracted position clear of said elevator, a platform on said frame adjacent and horizontally aligned with said elevator when said elevator is in said lowered position, said platform being adapted to support a stack of empty pallets, power means for producing a lateral force on pallets for moving empty pallets onto said elevator and for removing loaded pallets from said elevator while said elevator is in said lowered position, said elevator providing anti-friction roller support means providing a substantially constant predetermined drag having a value sufficient to prevent movement of pallets supported by said elevator while said elevator is raised and lowered, said predetermined drag being sufficiently small to allow rolling movement of pallets with respect to said elevator when a predetermined lateral force is applied to such pallets.

5. A palletizer as set forth in claim 4 wherein said anti-friction means are rollers journalled on said elevator, and friction means resiliently engaging said rollers to provide said drag.

6. A palletizer as set forth in claim 5 wherein said means to provide said drag include an elongated plank-like member engaging the lower side of said rollers, and spring means pressing said plank-like member against said rollers.

7. A palletizer for use with pallets which can be handled by fork type handling equipment comprising a frame, an elevator supported on said frame for powered vertical movement between a lowered position and a raised position, an arranging table supported on said frame for powered movement between an extended position over said elevator and a retracted position clear of said elevator, a platform on said frame adjacent to and horizontally aligned with said elevator when said elevator is in said lowered position, said platform being adapted to support a stack of empty pallets, a pusher supported on said frame for powered movement between a rest position and an operated position, said pusher operating to push the bottom pallet in a stack of pallets from said platform onto said elevator when said elevator is in said lowered position, and a fork lift mechanism supported on said frame for powered horizontal movement between rest position with its fork clear of said platform and an extended position with its fork over said platform, said fork lift mechanism being operable to insert its fork into the first pallet in the stack of pallets immediately above the bottom pallet in such stack, to raise said first pallet and all pallets thereabove clear of such bottom pallet, and thereafter to lower such first pallet to said platform after said pusher moves such bottom pallet to said elevator, said pusher operating to separately engage an empty pallet and a loaded pallet on said elevator and to remove said loaded pallet from said elevator while positioning an empty pallet thereon without producing contact between the loaded and empty pallets, said pusher including a first member for engaging and pushing an empty pallet, a second pusher member for engaging and pushing a loaded pallet, and a single power drive connected to operate both said first and second pusher members, said power drive including a lost motion drive allowing movement of said first pusher member without corresponding movement of said second pusher member during one portion of pusher operation and causing simultaneous movement of both of said pusher members during another portion of the pusher operation.

8. A palletizer as set forth in claim 7 wherein said second pusher member moves from one side of said elevator to the opposite side thereof as it pushes a loaded pallet from said elevator, said pusher operating to return said second pusher member to said one side of said elevator while said elevator is raised clear of said second pusher member.

* * * * *